US010609657B2

(12) United States Patent
Islam et al.

(10) Patent No.: US 10,609,657 B2
(45) Date of Patent: Mar. 31, 2020

(54) UPLINK TRANSMIT POWER CONTROL DURING RANDOM ACCESS PROCEDURES

(71) Applicant: QUALCOMM Incorporated, San Diego, CA (US)

(72) Inventors: Muhammad Nazmul Islam, Edison, NJ (US); Bilal Sadiq, Basking Ridge, NJ (US); Navid Abedini, Raritan, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/054,058

(22) Filed: Aug. 3, 2018

(65) Prior Publication Data

US 2019/0045457 A1    Feb. 7, 2019

Related U.S. Application Data

(60) Provisional application No. 62/542,118, filed on Aug. 7, 2017.

(51) Int. Cl.
*H04W 52/36* (2009.01)
*H04L 5/00* (2006.01)
(Continued)

(52) U.S. Cl.
CPC .......... *H04W 52/36* (2013.01); *H04B 7/0617* (2013.01); *H04L 5/0048* (2013.01);
(Continued)

(58) Field of Classification Search
CPC . H04W 52/146; H04W 52/325; H04W 52/36; H04W 52/40; H04W 52/50; H04W 74/0833; H04W 52/14; H04W 74/08; H04W 52/04; H04L 1/08; H04B 7/06; H04B 7/0617
See application file for complete search history.

(56) References Cited

U.S. PATENT DOCUMENTS

| 2014/0226551 A1* | 8/2014 | Ouchi | H04W 52/04 370/311 |
| 2014/0247796 A1* | 9/2014 | Ouchi | H04L 5/0053 370/329 |

(Continued)

OTHER PUBLICATIONS

Huawei, et al., "Impact of Multi-Beam Operations to Power-Ramping for RACH", 3GPP-Draft; R2-1706462 Impact of Multi-Beam Operations to Power Ramping for RACH, 3rd Generation Partnership Project (3GPP), Mobile Competence Centre; 650, Route Des Lucioles; F-06921 Sophia-Antipolis; France, vol. RAN WG2, No. Qingdao, China; Jun. 27, 2017-Jun. 29, 2017, Jun. 17, 2017 (Jun. 17, 2017), 3 Pages, XP051307001, Retrieved from the Internet: URL: http://www.3gpp.org/ftp/tsg_ran/WG2_RL2/TSGR2_AHs/2017_06_NR/Docs/ [dated Jun. 17, 2017].

(Continued)

*Primary Examiner* — Mewale A Ambaye
(74) *Attorney, Agent, or Firm* — Qualcomm Incorporated

(57) ABSTRACT

Beam specific power ramping counters may be used to adjust uplink transmit power. For example, a user equipment (UE) may use counters for beam specific power control of Random Access Channel (RACH) Message1 transmissions. A UE may transmit a RACH message1 on a beam specific resource and increment a counter corresponding to a gNB downlink beam. Power adjustments may be made on subsequent re-transmissions of the RACH message1 according to a power control policy. The power control policy may call for applying a power ramping function based on the value(s) of one or more of the counters.

22 Claims, 9 Drawing Sheets

(51) Int. Cl.
*H04W 74/08* (2009.01)
*H04W 52/14* (2009.01)
*H04W 52/50* (2009.01)
*H04B 7/06* (2006.01)
*H04W 52/32* (2009.01)
*H04W 52/40* (2009.01)

(52) U.S. Cl.
CPC ....... *H04W 52/146* (2013.01); *H04W 52/325* (2013.01); *H04W 52/40* (2013.01); *H04W 52/50* (2013.01); *H04W 74/0833* (2013.01)

(56) References Cited

U.S. PATENT DOCUMENTS

2015/0043465 A1* 2/2015 Ouchi .................. H04W 28/16 370/329
2018/0324853 A1* 11/2018 Jeon ...................... H04W 74/08

OTHER PUBLICATIONS

International Search Report and Written Opinion—PCT/US2018/045415—ISA/EPO—dated Oct. 4, 2018.

Mediatek Inc: "PRACH Msg1 Retransmission", 3GPP Draft; R1-1710823_PRACH_MSG1_Retransmission, 3rd Generation Partnership Project (3GPP), Mobile Competence Centre; 650, Route Des Lucioles; F-06921 Sophia-Antipolis; France, vol. RAN WG1, No. Qingdao, P.R. China; Jun. 27, 2017-Jun. 30, 2017, Jun. 17, 2017 (Jun. 17, 2017), 3 pages, XP051305246, Retrieved from the Internet URL: http://www.3gpp.org/ftp/tsg_ran/WG1_RL1/TSGR1_AH/NR_AH_1706/Docs/ [dated Jun. 17, 2017].

Nokia, et al., "NR 4-Step RACH Procedure", 3GPP Draft; R1-1708244_NR 4 Step RACH Procedure, 3rd Generation Partnership Project (3GPP), Mobile Competence Centre; 650, Route Des Lucioles; F-06921 Sophia-Antipolis; France, vol. RAN WG1, No. Hangzhou, China; May 15, 2017-May 19, 2017, May 14, 2017 (May 14, 2017), 12 Pages, XP051273438, Retrieved from the Internet: URL: http://www.3gpp.org/ftp/Meetings_3GPP_SYNC/RAN1/Docs/ [dated May 14, 2017].

NTT Docomo, et al., "Discussion on 4-Step Random Access Procedure for NR", 3GPP Draft; R1-1708443_Discussion on 4-Step Random Access Procedure for NR_Final, 3rd Generation Partnership Project (3GPP), Mobile Competence Centre; 650, Route Des Lucioles; F-06921 Sophia-Antipolis; France, vol. RAN WG1, No. Hangzhou; May 15, 2017-May 19, 2017, May 14, 2017 (May 14, 2017), 7 Pages, XP051273635, Retrieved from the Internet: URL: http://www.3gpp.org/ftp/Meetings_3GPP_SYNC/RAN1/Docs/.

* cited by examiner

UPLINK TRANSMIT POWER CONTROL DURING RANDOM ACCESS PROCEDURES

CLAIM OF PRIORITY UNDER 35 U.S.C. § 119

This application claims the benefit of U.S. Provisional Application Ser. No. 62/542,118, entitled "UPLINK TRANSMIT POWER CONTROL DURING RANDOM ACCESS PROCEDURES" and filed on Aug. 7, 2017 which is expressly incorporated by reference herein in their entirety.

The following relates generally to wireless communication, and more specifically to uplink transmit power control and downlink gNB beam selection during random access procedures.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations (e.g., a gNB or eNB) or other access network nodes, each simultaneously supporting communication for multiple communication devices, which may be otherwise known as user equipment (UE).

In some wireless systems, base stations and UEs may communicate using directional transmissions (e.g., beams), where beamforming techniques may be applied using one or more antenna arrays to generate beams in different directions. For example, a base station may transmit downlink communications (e.g., synchronization signals, data, etc.) to a UE using a transmit beam in a particular direction, and the UE may in turn receive the downlink communications on a receive beam in an opposite direction. In some cases, depending on a receive beam on which the downlink communications were received and a transmit beam for uplink communications from the UE, a high received power at a base station may result in interference for other users attempting to communicate with the base station. Alternatively, the uplink transmit power from the UE may too low, failing to meet a link budget for uplink communications received at the base station. It may thus be desirable to improve techniques for uplink transmit power control for beamformed communications.

SUMMARY

The described techniques relate to improved methods, systems, devices, or apparatuses that support uplink power control for random access procedures with a gNB that features beamforming. Generally, the described techniques provide for the use of one or more RACH counters for adjusting an uplink transmit power according to the current value in the counter and applying a power ramp according to the value in the counter. For example, a user equipment (UE) may receive downlink communications (e.g., synchronization signals, data, etc.) from a base station on a receive beam. The UE may calculate an uplink transmit power (e.g., for transmitting a random access channel (RACH) over a Physical Random Access Channel (PRACH)). For example, a counter value corresponding to one or more gNB transmit downlink beams may be used to adjust the transmit power according to a power ramping function.

A UE attempting to communicate with a gNB may monitor and receive gNB downlink signals, such as synchronization signals, over one or more downlink transmission beams. The downlink transmission beams may have antenna array gains that help mitigate the large air medium pathlosses experienced by communication systems operating with high carrier wave frequencies such as millimeter wave frequencies. After receiving the one or more downlink transmission signals, the UE may synch to the gNB downlink transmissions. The UE may also attempt to communicate with the gNB by transmitting a RACH preamble in one or more resources of a RACH slot. The RACH preamble and/or resource may be chosen by the UE such that the preamble and/or resource correspond to one or more gNB downlink beams. Downlink beams may correspond for example to directional Synchronization Signal (SS) blocks or Channel State Information Reference Signals (CSI-RS). The RACH preamble and/or resource choice may be used by the UE to communicate to the gNB on what downlink beam(s) the UE would like a RACH response sent.

To estimate the power to use when sending the RACH signal, the UE may estimate the pathloss to the gNB by comparing the gNB transmit power with the received power observed by the UE and adjust for any transmit and receive antenna gains on both the uplink and downlink. The UE may also calculate a RACH transmission power targeting a desired gNB receive power. The UE may then wait for a RACH response from gNB over the one or more downlink transmission beams identified by the RACH preamble and/or resource. If no RACH response is received, the UE may increment a counter corresponding to the one or more downlink transmission beams. The value stored in the counter may then be used to inform the UE of the number of RACH attempts for that beam. After each RACH attempt, the UE may adjust the transmission power according to a predetermined power ramping function and the counter value and resend the RACH preamble. The UE may also choose a different RACH preamble and/or resource corresponding to one or more different downlink beams.

DETAILED DESCRIPTION

Figure 1:
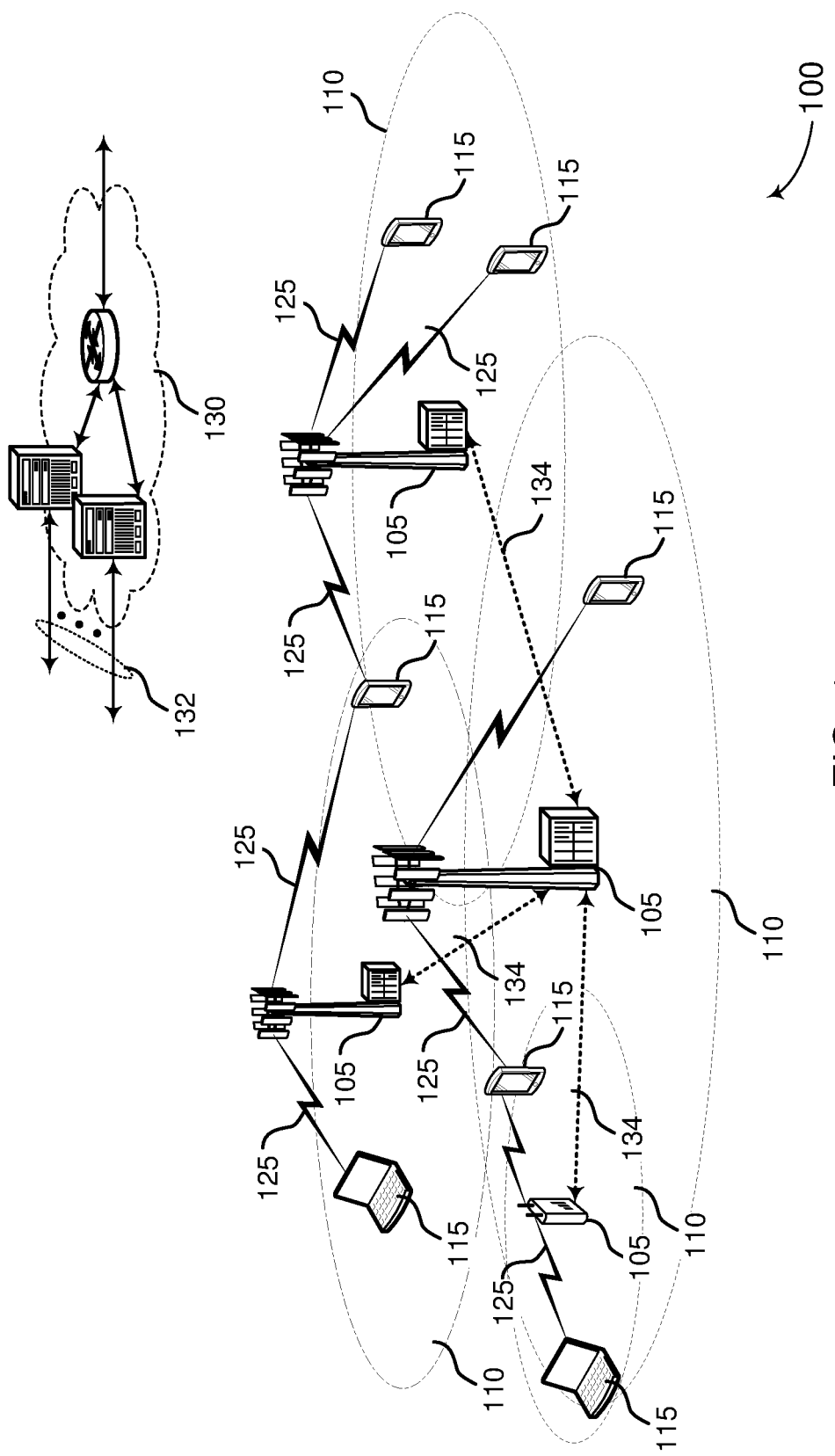
FIG. 1 illustrates an example of a system for wireless communication that supports uplink transmit power control during random access procedures in accordance with aspects of the present disclosure.

Some wireless communication systems may support beamformed transmissions between a base station and a user equipment (UE). For example, some systems may operate in millimeter wave (mmW) frequency ranges, e.g., 28 GHz, 40 GHz, 60 GHz, etc. Wireless communication at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome path losses at these frequencies. A wireless device may use a number of antenna ports (e.g., 1, 2, 4, 8 antenna ports) associated with arrays of antennas to form beams in various directions using a number of analog weight factors. For example, as a base station transmits downlink signals using directional beams, a UE may also utilize beamforming for the UE's own directional receive beams (and its uplink transmit beams for uplink transmissions to the base station).

A gNB may transmit SS blocks, CSI-RS signals or other downlink beam signals on different directional downlink transmit beams. An SS block may be a combination of Primary Synchronization Signals (PSS), Secondary Synchronization Signals (SSS) and/or Primary Broadcast Channel Signals (PBCH). The PBCH may have Demodulation Reference Signals (DMRS) embedded in them. The transmit beams may, over time, cover the geographic coverage area of a cell allowing a UE inside the cell to synchronize with the downlink transmit beams. UEs that wish to communicate with the gNB may send a RACH preamble in a resource that corresponds to one or more of the downlink transmit beams. The UE may select an initial RACH transmit power by estimating the pathloss from the gNB to the UE using the transmit power and received power of the synch signals, scaling the power by the downlink and uplink array gains and targeting a desired gNB receive power. The UE may choose a RACH preamble and/or RACH resource that corresponds to one or more downlink beams that the UE would like the gNB to transmit a RACH response on. If the gNB receives the RACH preamble, it may in turn transmit a RACH response to the UE on the downlink transmit beam corresponding to the preamble resource that it was received on.

If, however, after a predetermined time period, the UE does not receive a RACH response it may increment a counter corresponding to the one or more downlink transmit beams. The counter may then be used by the UE to inform the UE how many RACH attempts have occurred on the one or more transmit beams. The UE may ramp up its RACH transmit power according to the value of the counter. For example, if there have been two RACH transmissions corresponding to one or more transmit beams without receiving a RACH response the value of the counter would be two. On its next RACH transmission attempt, the UE would target the transmit power corresponding to the gNB desired received power level and apply the power ramp. For example if the power ramp is one dB per unsuccessful attempt, and the counter value is two, the UE would add two dB to the transmit power.

When there is an unsuccessful RACH attempt the UE may strategically choose a different preamble and/or resource that corresponds to a second set of one or more different downlink transmit beams. In some embodiments, a second counter may be used that corresponds to the second set of one or more downlink transmit beams. If a RACH attempt is not successful, the second counter may be incremented. A different (or the same) power ramping function may be applied to this second counter as well. For example, a 2 dB per unsuccessful RACH attempt ramp function may be applied to this second set of one or more downlink beams. For example, if the value of this second counter is two, the UE would add four dB to the transmit power on its next RACH transmission attempt.

In different embodiments, the counter(s) may be reset according to different power control policies. In one exemplary embodiment the power ramping counter for a beam is incremented when the UE chooses a different preamble and/or resource that corresponds to one or more different downlink transmit beams. In another embodiment, the power ramping counter remains the same when the UE chooses a different preamble and/or resource that corresponds one or more different downlink beams. In a further embodiment, the power ramping counter remains the same with a second power ramping counter inheriting the value of the first ramping counter when the UE chooses a different preamble and/or resource that corresponds to one or more different downlink beams. Each of these criteria may be applied with a single counter for tracking RACH attempts on UE basis or multiple counters may be used to track the number of attempts for each set of one or more downlink beams corresponding to the resource and/or preamble used.

Aspects of the disclosure are initially described in the context of a wireless communications system. Examples are also provided which describe various transmit and receive beam configurations for which efficient transmit power control may be applied using one or more RACH beam transmission counters. Aspects of the disclosure are further illustrated by and described with reference to apparatus diagrams, system diagrams, and flowcharts that relate to uplink transmit power control during random access procedures.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices. Wireless communications system 100 may support the use of a difference in transmit and receive array gains for the calculation of an uplink transmit power. Accordingly, a power offset may be used when calculating an uplink random access transmit power.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as gNBs 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, Internet Protocol (IP) connectivity, and other access, routing, or mobility functions. At least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 5 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Wireless communications system 100 may support mmW communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A radio link control (RLC) layer may in some cases perform packet segmentation and reassembly to communicate over logical channels. A medium access control (MAC) layer may perform priority handling and multiplexing of logical channels into transport channels. The MAC layer may also use hybrid automatic repeat request (HARQ) to provide retransmission at the MAC layer to improve link efficiency. In the control plane, the radio resource control (RRC) protocol layer may provide establishment, configuration, and maintenance of an RRC connection between a UE 115 and a network device or core network 130 supporting radio bearers for user plane data. At the physical (PHY) layer, transport channels may be mapped to physical channels.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

A UE 115 attempting to access a wireless network may perform an initial cell search by detecting a primary synchronization signal (PSS) from a base station 105. The PSS may enable synchronization of slot timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. After receiving the PSS and SSS, the UE 115 may receive a master information block (MIB), which may be transmitted in a physical broadcast channel (PBCH) by the base station 105. The MIB may contain system bandwidth information, a system frame number (SFN), and a physical HARQ indicator channel (PHICH) configuration.

After decoding the MIB, the UE 115 may receive one or more system information blocks (SIBs). For example, SIB1 may contain cell access parameters and scheduling information for other SIBs. For instance, SIB1 access information, including cell identity information, and it may indicate whether a UE 115 is allowed to camp on a coverage area 110. SIB1 also includes cell selection information (or cell selection parameters) and scheduling information for other SIBs, such as SIB2. Decoding SIB1 may enable the UE 115 to receive SIB2, where SIB2 may contain radio resource control (RRC) configuration information related to random access channel (RACH) procedures, paging, physical uplink control channel (PUCCH), physical uplink shared channel (PUSCH), power control, sounding reference signal (SRS), and cell barring. Different SIBs may be defined according to the type of system information conveyed. In some cases, SIB2 may be scheduled dynamically according to information in SIB1, and includes access information and parameters related to common and shared channels.

After the UE 115 decodes SIB2, it may transmit a RACH preamble to a base station 105. For example, the RACH preamble may be randomly selected from a set of 64 predetermined sequences. This may enable the base station 105 to distinguish between multiple UEs 115 trying to access the system simultaneously. The base station 105 may respond with a random access response that provides an uplink resource grant, a timing advance, and a temporary cell radio network temporary identifier (C-RNTI). The UE 115 may then transmit an RRC connection request along with a temporary mobile subscriber identity (TMSI) (e.g., if the UE 115 has previously been connected to the same wireless network) or a random identifier. The RRC connection request may also indicate the reason the UE 115 is connecting to the network (e.g., emergency, signaling, data exchange, etc.). The base station 105 may respond to the connection request with a contention resolution message addressed to the UE 115, which may provide a new C-RNTI. If the UE 115 receives a contention resolution message with the correct identification, it may proceed with RRC setup. If the UE 115 does not receive a contention resolution message (e.g., if there is a conflict with another UE 115), the UE 115 may repeat the RACH process by transmitting a new RACH preamble.

Wireless devices in wireless communications system 100 may send transmissions in accordance with a certain link budget. The link budget may account for allowed signal attenuation between a UE 115 and a base station 105, as well as antenna gains at the UE 115 and base station 105. Accordingly, the link budget may provide, for example, a maximum transmit power for the various wireless devices within wireless communications system 100. In some cases, a UE 115 may coordinate transmit power with a serving base station 105 to mitigate interference, improve the uplink data rate, and prolong battery life.

Uplink power control may include a combination of open-loop and closed-loop mechanisms. In open-loop power control, the UE transmit power may depend on estimates of the downlink path-loss and channel configuration. In closed-loop power control, the network may directly control the UE transmit power using explicit power-control commands. Open-loop power control may be used for initial access, such as the transmission of a physical random access channel (PRACH) by a UE 115, whereas both open and closed loop control may be used for uplink control and data transmission. A UE 115 may determine power using an algorithm that takes into account a maximum transmission power limit, a target base station receive power, path loss, modulation and coding scheme (MCS), the number of resources used for transmission, and a format of the transmitted data (e.g., physical uplink control channel (PUCCH) format). Power adjustments may be made by a base station 105 using a transmit power command (TPC) messages, which may incrementally adjust the transmit power of a UE 115 as appropriate.

A UE 115 may determine an uplink transmit power for a PRACH based on an estimated path loss (e.g., a path loss experienced during synchronization). For example, the UE 115 may estimate a path loss and determine an uplink transmit power for sending a RACH in accordance with the equation:

$$P_{PRACH} = \min\{P_{CMAX_c}(i), \text{PREAMBLE\_RECEIVED\_TARGET\_POWER} + PL_c\}\_[\text{dBm}] \quad (1)$$

where $P_{CMAX,c}$ is a configured maximum transmit power for a subframe i of a serving cell c for a UE 115, PREAMBLE_RECEIVED_TARGET_POWER is a desired receive power indicated by a base station 105 (e.g., in system information block 1 (SIB-1)), and $PL_c$ is a downlink path loss estimate determined by the UE 115 for the serving cell c. After determining the uplink transmit power for PRACH, the UE 115 may then transmit a RACH preamble using PRACH to the base station 105 at the determined power level. In some examples, a base station may direct power adjustments based on beam correspondence (or lack thereof) experienced by a UE 115. In such cases, the base station may provide instruction to the UE 115 to utilize a power offset when calculating an uplink transmit power, such as an uplink transmit power for a PRACH.

Wireless communications system 100 may support the use of a transmit array gain and a receive array gain when adjusting an uplink transmit power. For example, a UE 115 may receive downlink communications (e.g., synchronization signals, data, etc.) from a base station 105 on a receive beam having an array gain that is different from an array gain for an uplink transmit beam. The UE 115 may adjust an uplink transmit power (e.g., for transmitting a RACH preamble) based on a difference in the array gains. For example, a parameter representing the difference in the array gains may be used in addition to a maximum allowed transmit power, a target preamble received power, and an estimated path loss when calculating the uplink transmit power for the RACH transmission. The adjustment may result in a higher or lower transmit power depending on the difference in the receive array gain and the transmit array gain. In some cases, the use of the transmit and receive array gains when determining the uplink transmit power may be based on whether the UE 115 has beam correspondence, or may be based on interference levels for a communications link between the UE 115 and base station 105. In some examples, a base station may provide instruction to the UE 115 to adjust the transmit power, for example, based on the presence or absence of beam correspondence or interference levels.

The UE 115 may also feature a counter or a plurality of counters for open loop transmission control. The counter may be used by the UE to keep count of the number of RACH transmissions. The counters may be used strategically according to a power control policy to apply power ramping to subsequent UE RACH transmissions. In some embodiment a single counter may be used for applying a ramping function for RACH attempts corresponding to all sets of one or more downlink transmit beams. In other embodiments a plurality of counters corresponding to a plurality of sets of one or more downlink transmit beams may be use for applying a ramping function to RACH attempts on each of the plurality of one or more downlink transmit beams.

Figure 2:
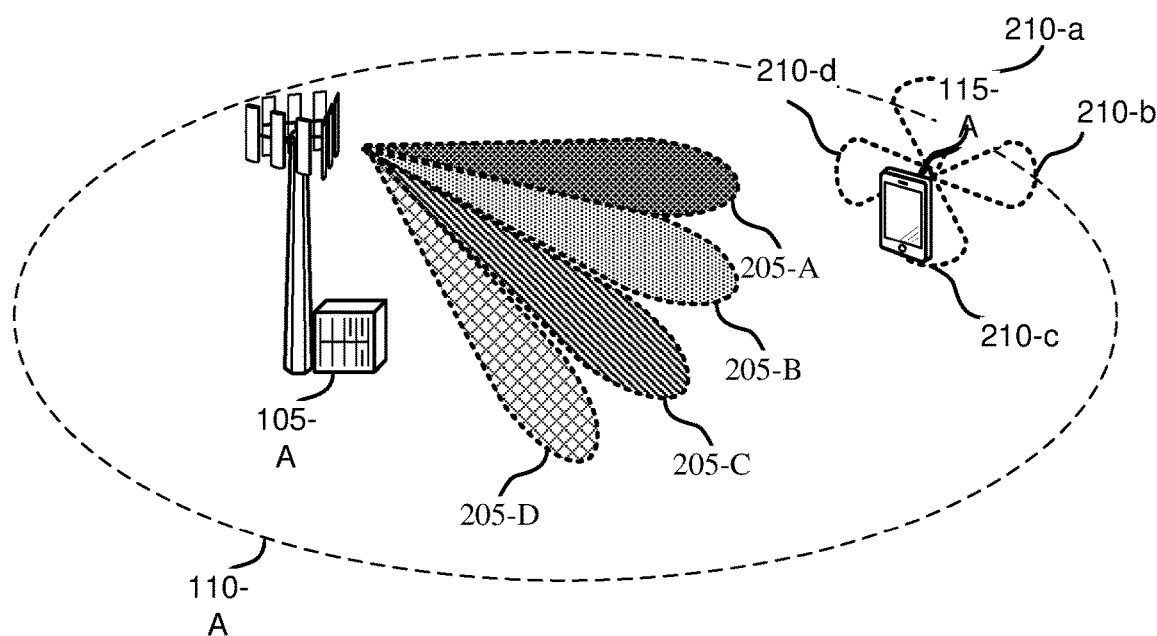
FIG. 2 illustrates an example of a wireless communications system that supports uplink transmit power control during random access procedures in accordance with aspects of the present disclosure.
Figure 2:
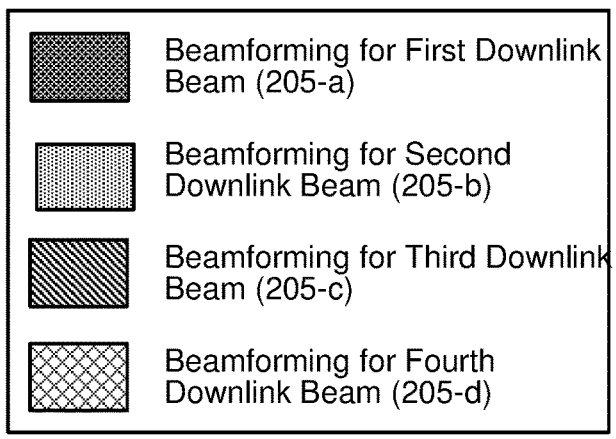

FIG. 2 illustrates an example of a wireless communications system 200 that supports uplink transmit power control during random access procedures in accordance with various aspects of the present disclosure. In some examples, wireless communications system 200 may implement aspects of wireless communications system 100. For example, wireless communications system may include a base station 105-a and a UE 115-a, which may be examples of the corresponding devices described with reference to FIG. 1. Wireless communications system 200 may support uplink transmit power control based on array gains for transmit and receive beams at UE 115-a, enabling efficient power adjustment techniques for transmitting random access transmissions.

Wireless communications system 200 may support beamformed transmissions between base station 105-a and UE 115-a. For example, wireless communications system 200 may operate using multiple communication beams (e.g., in mmW frequency ranges). As a result, signal processing techniques, such as beamforming may be used to combine energy coherently and, for example, overcome path losses. By way of example, base station 105-a may utilize multiple antennas, and each antenna may transmit (or receive) a phase-shifted version of a signal such that the phase-shifted versions constructively interfere in certain regions and destructively interfere in others. Weights may be applied to the various phase-shifted versions, e.g., in order to steer the transmissions in a desired direction. Such techniques (or similar techniques) may serve to increase the coverage area 110-a of the base station 105-a or otherwise benefit wireless communications system 200.

Base station 105-a may include downlink beams 205 for communication and UE 115-a may also include beams 210 for communication. Beams 205 and beams 210 may represent examples of directional beams over which data (or control information) may be transmitted and received. Accordingly, each beam 205 may be directed from base station 105-a toward a different region of the coverage area 110-a and in some cases, two or more of beams 205 and 210 may overlap. Beams 205 and 210 may also be utilized simultaneously or at different times.

In some cases, a mapping may exist between a beam 210 used to receive downlink transmissions (e.g., a UE receive beam 210-a) and a beam 210 used for sending uplink transmissions (e.g., a UE transmit beam 210-b). For example, base station 105-a may send a downlink transmission using beam 205-a and UE 115-a may receive the downlink transmission using downlink receive beam 210-a. Based on the use of receive beam 210-a for the downlink transmission, UE 115-a may then map a corresponding uplink transmit beam 210-b for sending an uplink transmission to base station 105-a, thereby creating a beam pair. In such cases, UE 115-a may be said to have beam correspondence. In other cases, UE 115-a may not have beam correspondence. For instance, base station 105-a may send a downlink transmission using beam 205-a and UE 115-a may receive the downlink transmission on, for example, one or more sidelobes corresponding to receive beam 210-a, or on receive beam 210-b. UE 115-a may then use another beam 210, that may not correspond (i.e., a mapping does not exist) to downlink receive beam 210-a when sending an uplink transmission. In such cases, UE 115-a may have been unable to determine a beam pairing based on the angle of arrival of the downlink transmission or based on the downlink transmission being received in a different direction than receive beam 210-a.

In wireless communication system 200, UE 115-a may determine an uplink transmit power for a RACH transmission based on an estimated path loss (e.g., a path loss experienced during synchronization). UE 115-a may estimate a path loss and calculate an uplink transmit power for sending a RACH, for example, using Equation 1 described above. After determining an uplink transmit power, UE 115-a may then transmit a RACH transmission to base station 105-a at the determined transmit power level. However, base station 105-a may receive the RACH transmission from UE 115-a at an undesirable power level due to a mismatch between an array gain associated with a downlink receive beam 210-a (e.g., a power gain of received signals associated with an antenna array) and an array gain associated with an uplink transmit beam 210-b (e.g., a power gain of transmitted signals associated with an antenna array). For example, the array gains associated with downlink receive beam 210-a and uplink transmit beam 210-b may have different power gain values (e.g., beam correspondence may not exist). In some examples, an angle of arrival associated with downlink receive beam 210-a may be different than an angle of departure associated with uplink transmit beam 210-b and may result in the array gain mismatch. As a result, base station 105-a may receive a RACH transmission from UE 115-a with a higher or lower power than desired. In some cases, receiving random access transmissions from UE 115-a at a power level above a desired level may interfere with RACH preambles of another UE 115. In other cases, receiving a RACH from UE 115-a at a power level below a desired level may not meet a link budget for transmission within wireless communications system 200.

In some examples, UE 115-a may adjust an uplink transmit power for a RACH transmission based on downlink and uplink array gains. For instance, UE 115-a may use array gains associated with downlink receive beam 210-a and uplink transmit beam 210-b to determine an uplink transmit power for a RACH transmission. In some cases, UE 115-a may calculate the uplink transmit power for the RACH transmission using a difference between the downlink and uplink array gains, in addition to a target preamble received power and an estimated path loss. For example, UE 115-a may determine an uplink transmit power for sending a RACH according to the following equation:

$$P_{PRACH} = \min\{P_{CMAX_c}(i), \text{PREAMBLE\_RECEIVED\_TARGET\_POWER} + PL_c + \text{Array\_Gain\_Difference}\}\_[\text{dBm}] \quad (2)$$

where $P_{CMAX_c}(i)$ is the configured maximum transmit power for a subframe i of a serving cell c for UE 115-a, PREAMBLE_RECEIVED_TARGET_POWER is a desired receiving power of a PRACH preamble indicated by base station 105-a, $PL_C$ is the downlink path loss estimate determined by UE 115-a for the serving cell c, and Array_Gain_Difference is a power adjustment value (e.g., a power offset) corresponding to the difference between an array gain for a downlink receive beam 210-a and an array gain for an uplink transmit beam 210-b. UE 115-a may add the power offset to a preamble received target power and estimated path loss to find the uplink transmit power. In other cases, the power offset may be subtracted to find the uplink transmit power.

Figure 3:
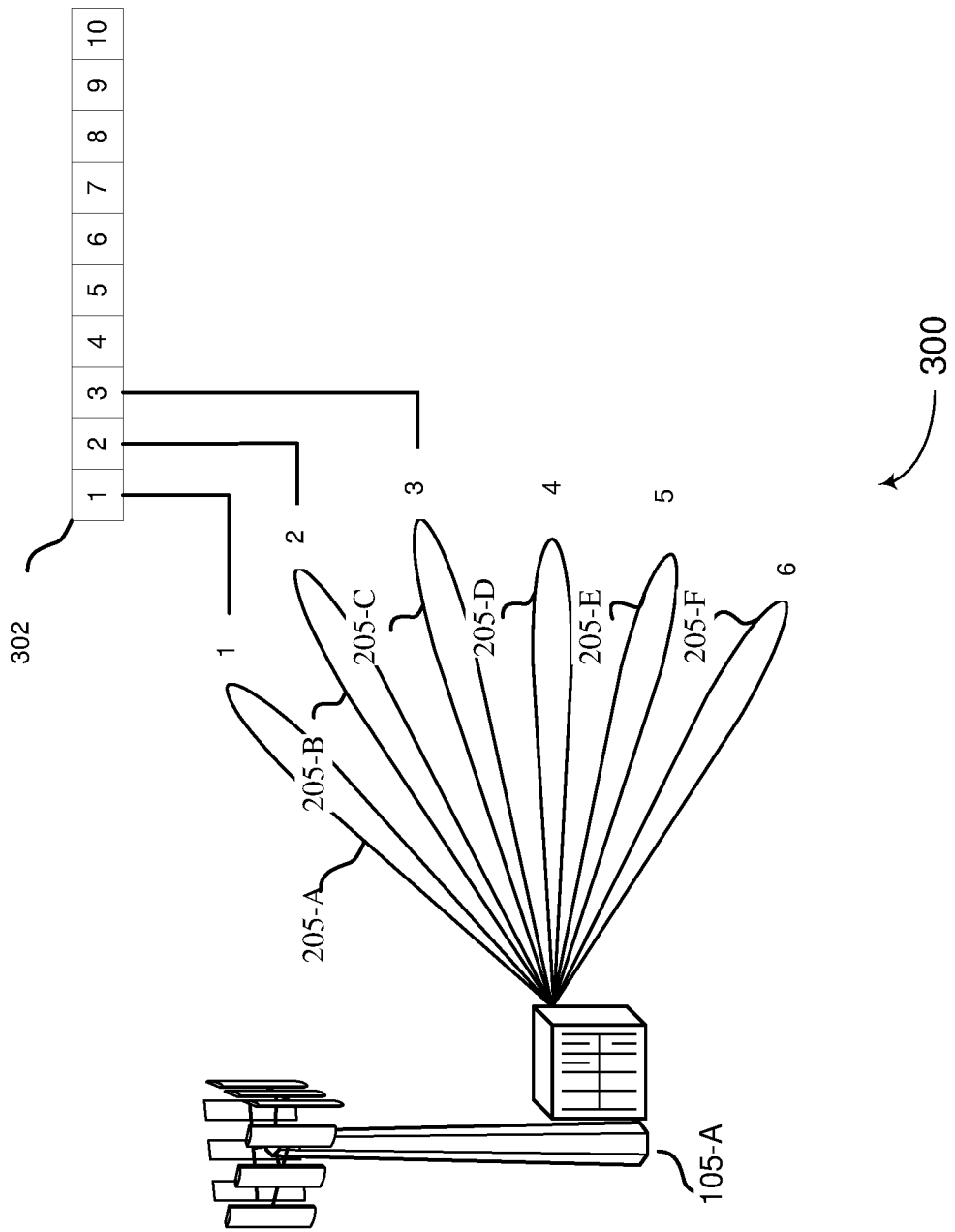
FIG. 3 illustrates examples of directional beams that may be mapped to RACH resources of a RACH slot in accordance with aspects of the present disclosure.

The UE 115-a may transmit a RACH message (e.g. RACH message1) to the base station 105-a. The RACH message may have a preamble and/or be transmitted on a resource that indicates to the base station on which one of the downlink beams 205 the UE 115 would like to receive a RACH response (e.g. RACH message2). The UE 115-a may have one or more counters corresponding to each of the downlink beam 205. The counters may be used to count the number of RACH message transmissions and re-transmissions for each of the beams. A power ramping policy that adjust power RACH transmission power based on the value of each of the beam counters may be employed by the UE 115. (e.g., including a base station transmit beam and a base station receive beam), FIG. 3 illustrate examples of directional beams that may be mapped to RACH resources of a RACH slot 302 in a wireless communication system 300. Base station 105-a may beam sweep over a cell coverage area in both azimuth and elevation with a variety of downlink transmit beams 205. These downlink transmit beams 205 may comprise Synchronous Signal Blocks (SS) blocks, Channel State Information Reference Signals (CSI-RS) or other suitable downlink signals. At higher frequencies the base station 105-a may employ narrow beams to achieve large antenna array gains to combat large path losses. SS blocks corresponding to different downlink beams may be smaller in number at lower frequencies and larger at higher frequencies. In one aspect SS blocks corresponding to different downlink beams used by the base station 105-a may be 4 SS blocks for 0-3 GHz transmissions, 8 SS blocks for 3-6 GHz transmissions and 64 SS blocks for 6 GHz and higher transmissions.

As base station 105-a sweeps over the cell coverage area UE-115-a may synchronize with one of the downlink transmit beams 205. The UE-115 may be able to receive multiple transmit beams. To connect with the base station 105-a the UE-115-a may choose one of the transmit beams for a RACH procedure. The UE-115 may transmit a RACH message (i.e. RACH message1) to the base station 105-a. To communicate to the base station 105-a on which downlink beam the UE would like to receive a RACH message (i.e. RACH message2), the UE 115-a may transmit its RACH message1 on a specific resource corresponding to the desired downlink beam and/or using a RACH preamble that is associated with the desired downlink beam.

In this example, there is a one-to-one mapping between downlink transmit beams and resources in a RACH slot 302. Downlink beam 1—205-a maps to resource 1 of RACH slot 302; downlink beam 2—205b maps to resource 2 of RACH slot 302, downlink beam 3—205c maps to resource 3 of RACH slot 302 and so on. Thus, if UE chooses downlink beam 2—205c it will send its RACH message1 in resource 2 signaling the base station 105-a a request to receive a RACH message2 on downlink beam 2-205b.

It can be appreciated that in other aspects a preamble can be used in conjunction with a RACH resource to communicate on which downlink beam the UE-115-a would like to receive a RACH message2 on. That way, a single RACH slot 302 resource may be reused for multiple downlink beams. Different RACH preambles may be associated with different downlink beams allowing the base station-105a to determine which downlink beam it should use for RACH message2. It can also be appreciated that in other aspects a resource and/or preamble pairing may not be beam unique and that a message2 may be sent on more than one downlink corresponding to a RACH resource and preamble pair.

Figure 4:
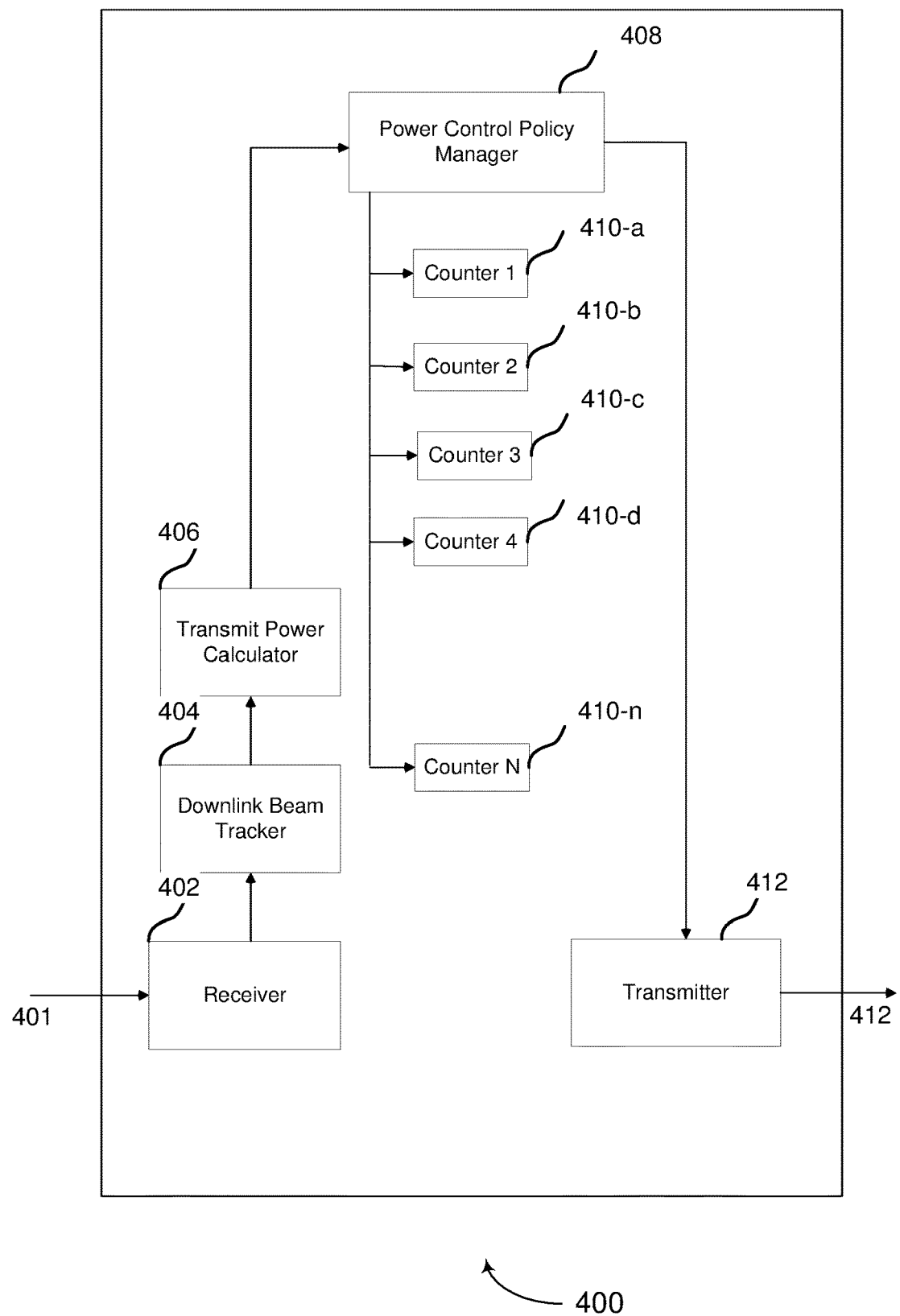
FIG. 4 illustrates a functional block diagram of a UE according to an exemplary aspect of the present disclosure.

FIG. 4 illustrates a functional block diagram of a UE 400 according to an exemplary aspect of the present disclosure. The UE 400 may receive downlink beam signals 401 from a base station via a receiver 402. A beam tracker may track each of the downlink beams received by the UE 400. A transmit power calculator 406 may then estimate the amount of power required for a transmitted signal to reach the base station at a desired receive power level. This power level may be used for transmitting an initial RACH message1.

A power control policy manager 408 may take the calculated transmit power calculated by the transmit power calculator 406 and apply one or more power ramps for RACH message1 re-transmissions according to a power control policy. The policy manager 408 may employ beam specific counters 410 to determine the amount of power to add to the calculated transmit power on subsequent retransmissions. Counter 410-a may be used for tracking the number of RACH message1 transmissions on a resource/preamble corresponding to a first beam; Counter 410-b may be used for tracking the number of RACH message1 transmissions on a resource/preamble corresponding to a second beam; Counter 410-c may be use for tracking the number or RACH message1 transmissions on a resource/preamble corresponding to a third beam and so on.

The power control policy manager 408 may reset the counters 410 based on the power control policy. In one aspect the power control policy manager may reset all the counters after receiving a RACH message2 or completing a RACH procedure. The power control policy manager 408 may also apply one or more power ramps based on the values in the one or more counters. The power control policy manager 408 may also limit the power ramping to $P_{CMAX_c}(i)$. The power control policy used by the power control policy manager 408 may be determined by the UE or it may be received on a broadcast message from one or more base stations.

A transmitter 412 controlled by the power control policy manager 408 may transmit RACH message1 412 messages according to the power control policy. The transmitter may transmit these messages on a preamble and/or resource that indicate on which downlink transmit beam a base station should transmit a RACH message2.

Figure 5:
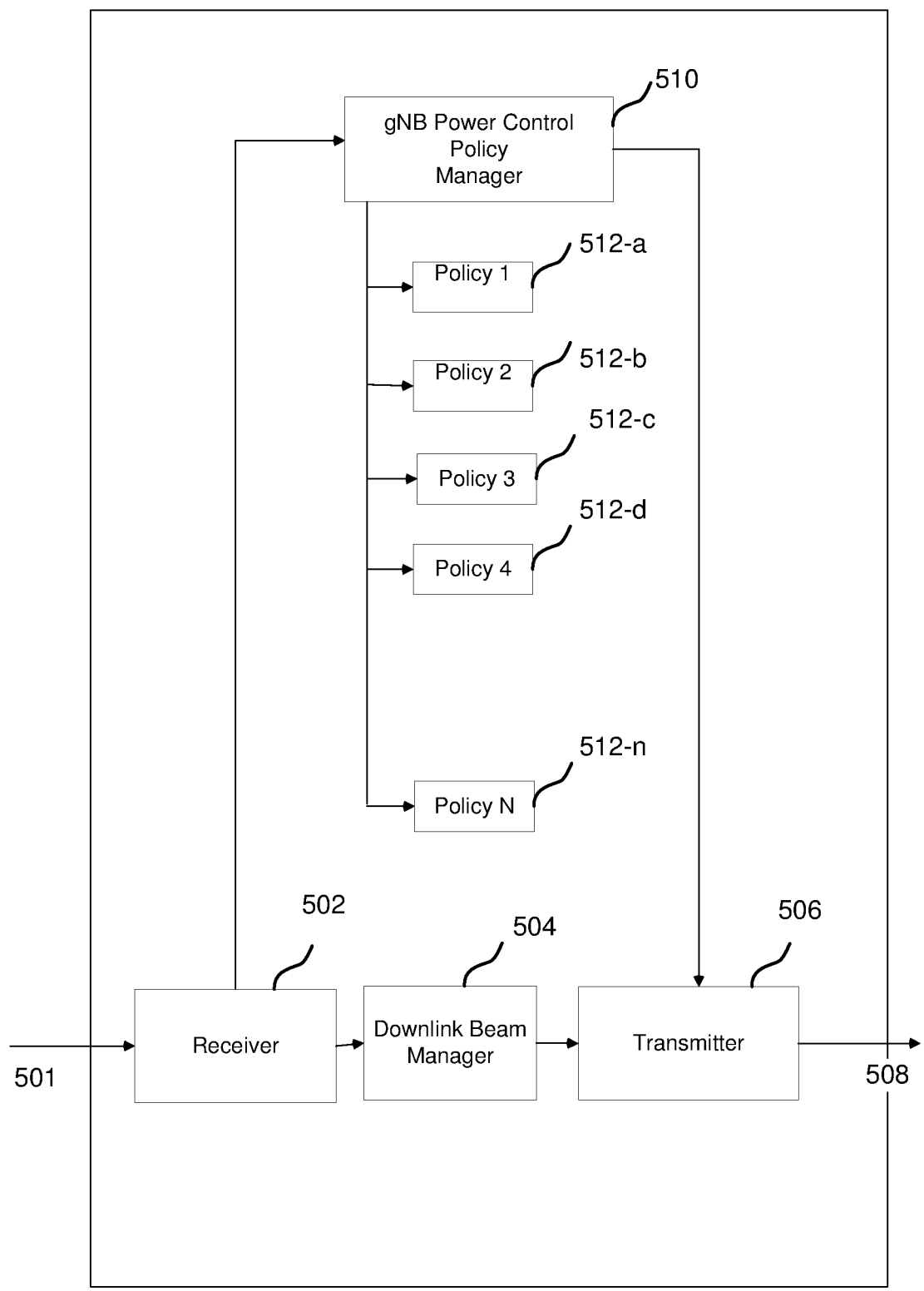
FIG. 5 illustrates a functional block diagram of a gNB according to an exemplary aspect of the present disclosure.

FIG. 5 illustrates a functional block diagram of a gNB 500 according to an exemplary aspect of the present disclosure. The gNB 500 may receive a RACH message1 501 via receiver 502. A downlink beam manager 504 may determine on which resource the RACH message1 was received and/or the preamble of the RACH message1 501. The downlink beam manager 504 may use this information to determine on which downlink beam transmitter 506 should transmit a RACH message2 508.

In some aspects, the gNB will determine the RACH message1 power control policy for UEs inside the cell. The gNB Power Control Policy Manager 510 may select one of many different power management policies. Information about the selected power management policy may be broadcast to the UE in the cell by transmitter 506.

Figure 6:
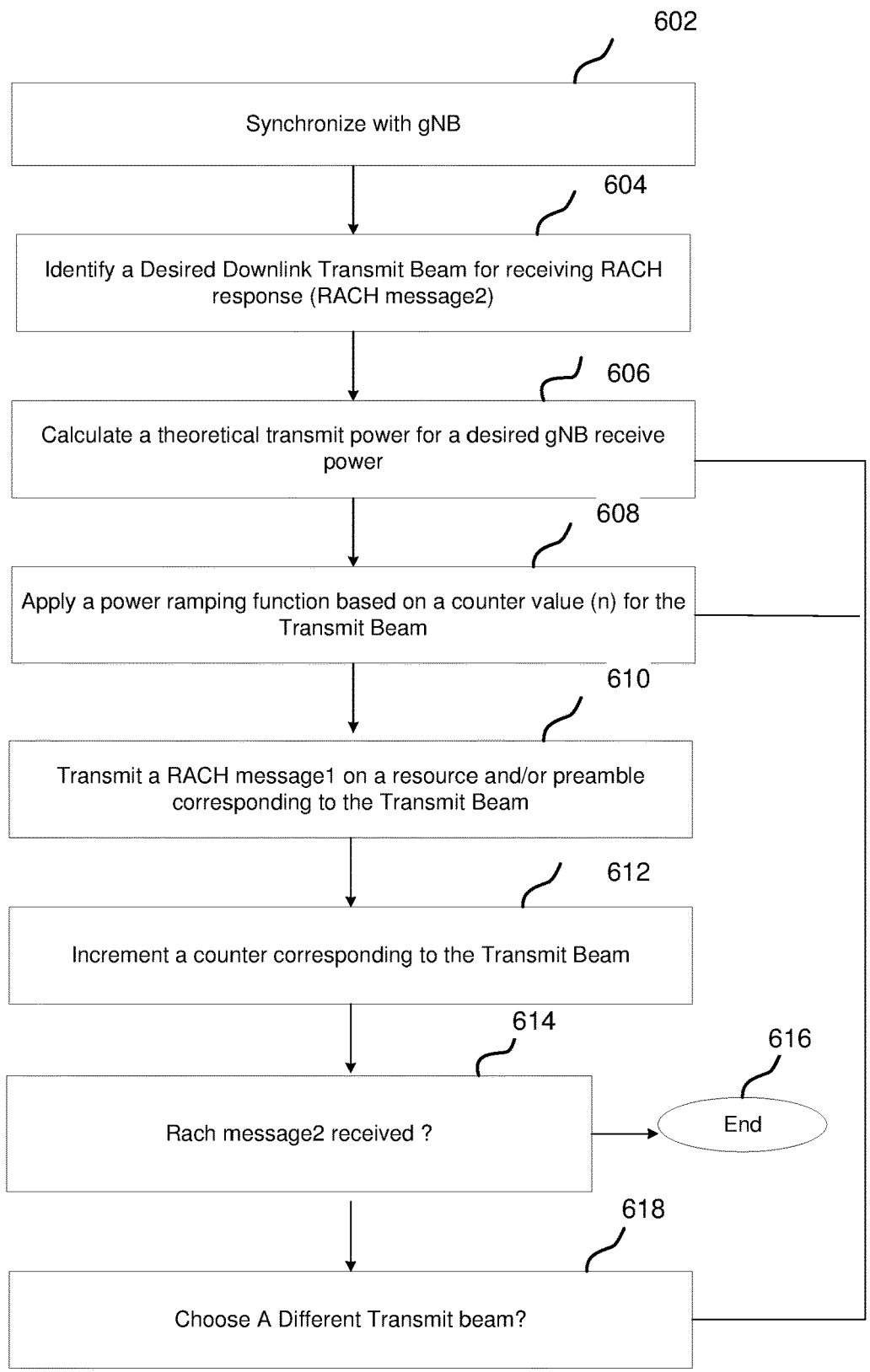
FIG. 6 illustrates a first exemplary flow diagram of a RACH procedure according to an aspect of the present disclosure.

FIG. 6 illustrates a first exemplary flow diagram of a RACH procedure according to an aspect of the present disclosure. A UE may synchronize with a gNB 602. The UE may then detect a number of downlink signals. The downlink signals may be for example SS blocks, a CSI-RS signals or other gNB downlink signals. The UE may also identify a desired downlink transmit beam for receiving a RACH message2 604. The UE may then calculate a theoretical transmit power required for a desired gNB receive power 606. The theoretical transmit power may be a function of the transmit antenna array gain, the receive antenna array gain, the desired receive power and the path loss. In one aspect, the uplink path loss may be estimated by calculating the downlink path loss as explained previously.

A series of counters may be employed to count the number of RACH transmissions on each beam. A power ramping function based on the counter value may be applied. In one aspect, the UE will apply a power ramping function based on the counter value (n) for the desired transmit beam 608. For the first transmission the counter value may be 0 with no power ramp applied to the theoretical transmit power. If the RACH transmission is a RACH message1 re-transmission a power ramp may be applied based on the counter value (n). For example, if there had been two previous RACH transmissions the counter value (n) would be two. If the power control policy for that beam specified a 2 dB ramp the UE would add 4 db to the theoretical transmit power (i.e 2 dB ramp times counter value (n)=2).

The UE may then transmit RACH message1 on a resource and/or preamble corresponding to the desired downlink transmit beam 610. The UE may then increment a counter corresponding to the transmit beam 612. The counter may thus inform the UE of the number of RACH message1 transmission attempts. The UE may then wait for RACH message2 and if the RACH message2 is received the process would end 616 and the UE may reset all of the counters. If a RACH message2 is not received the UE may choose a different downlink transmit beam 616 or it may choose to try the same transmit beam again. In one aspect the flow may revert to calculating a theoretical transmit power for a desired gNB receive power 606. In another aspect the previous theoretical transmit power computed may be used and flow may revert to applying a power ramping function based on a counter value (n) for the transmit beam 608.

To further illustrate flow according to FIG. 6, posit the following example. The UE may receive successfully synch signals from at least two downlink transmit beams. The UE selects a first beam and transmits a RACH message1 with a resource and/or preamble corresponding to the first beam. A first counter corresponding to the first beam would now have a value of 1. For the second transmission the UE selects the first beam once again, applies the power ramping function and transmits RACH message1 again. The first counter would now have a value of 2. The UE then selects the second downlink beam for transmitting a RACH message. The UE transmits RACH message1 again. Now the first counter would have a value of 2 and the second counter a value of 1. The UE now selects the first beam again, applies the power ramping function and transmits RACH message1 again. Now the first counter would have a value of 3 and the second counter would have a value of 1. The UE now select beam 2 again, applies the power ramping function and transmits RACH message1 again. The first counter value would now be 3 and the second counter value would be 2. At this point, the UE receives a RACH message2 and the procedure ends. The UE may reset the counters.

Figure 7:
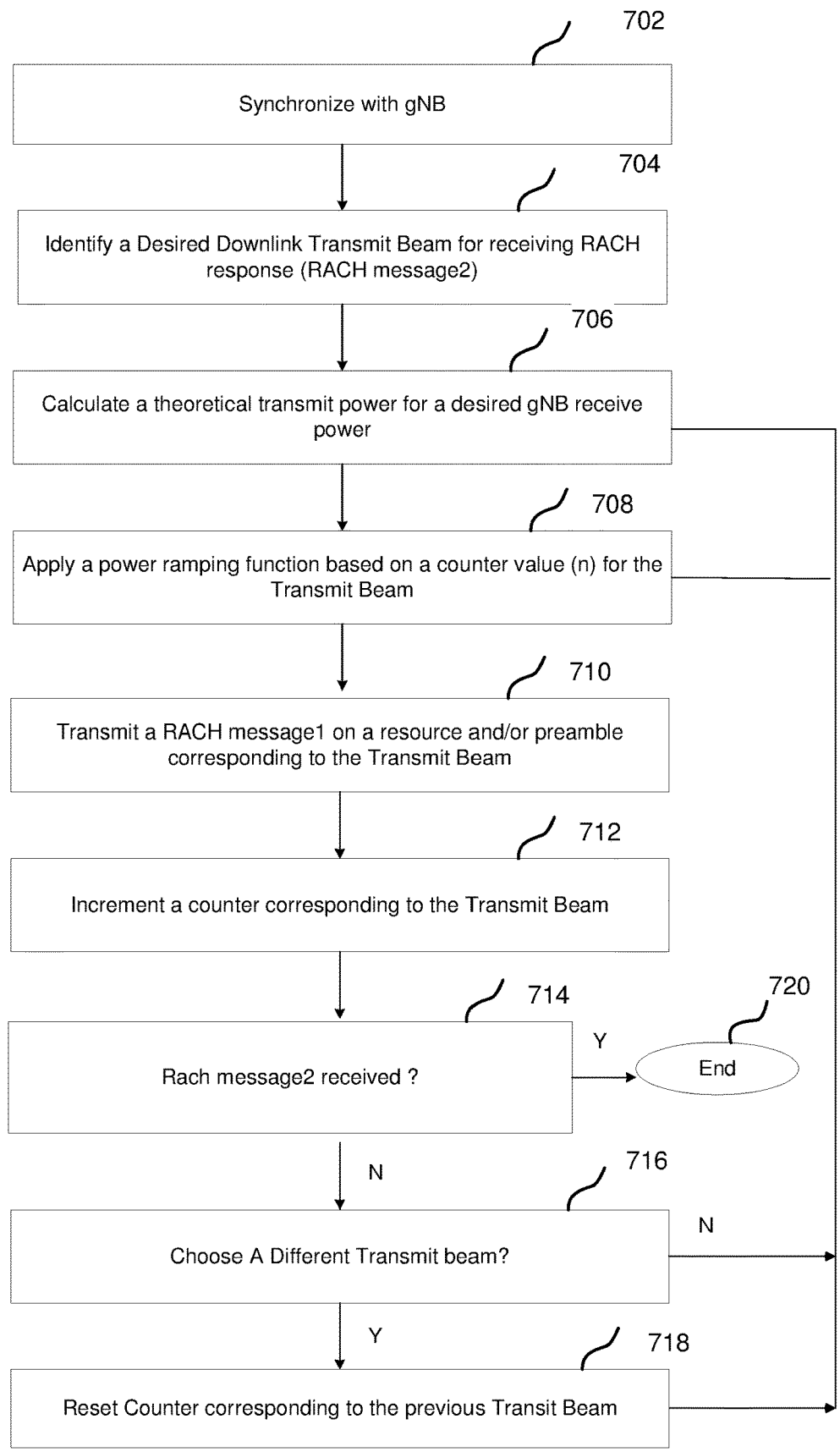
FIG. 7 illustrates a second exemplary flow diagram of a RACH procedure according to an aspect of the present disclosure.

FIG. 7 illustrates a first exemplary flow diagram of a RACH procedure according to an aspect of the present disclosure. A UE may synchronize with a gNB 702. The UE may then detect a number of downlink signals. The downlink signals may be for example SS blocks, CSI-RS signals or other gNB downlink signals. The UE may also identify a desired downlink transmit beam for receiving a RACH message2 704. The UE may then calculate a theoretical transmit power required for a desired gNB receive power 706. The theoretical transmit power may be a function of the transmit antenna array gain, the receive antenna array gain, the desired receive power and the path loss. In one aspect, the uplink path loss may be estimated by calculating the downlink path loss as explained previously.

A series of counters may be employed to count the number of RACH transmissions on each beam. A power ramping function based on the counter value may be applied. In one aspect, the UE will apply a power ramping function base on the counter value (n) for the desired transmit beam 708. For the first transmission the counter value may be 0 with no power ramp applied to the theoretical transmit power. If the RACH transmission is a RACH message1 re-transmission a power ramp may be applied based on the counter value (n). For example, if there had been two previous RACH transmission the counter value (n) would be two. If the power control policy for that beam specified a 1 dB ramp the UE would add 2 db to the theoretical transmit power (i.e 1 dB ramp times counter value (n)=2).

The UE may then transmit RACH message1 on a resource and/or preamble corresponding to the desired downlink transmit beam 710. The UE may then increment a counter corresponding to the transmit beam 712. The counter may thus inform the UE of the number of RACH message1 transmission attempts. The UE may then wait for RACH message2 and if the RACH message2 is received the process would end 720 and the UE may reset all of the counters. If a RACH message2 is not received the UE may choose a different downlink transmit beam 716, and reset the counter corresponding to the previous transmit beam 718. In one aspect the flow may revert to calculating a theoretical transmit power for a desired gNB receive power 706. In another aspect the previous theoretical transmit power computed may be used and flow may revert to applying a power ramping function based on a counter value (n) for the transmit beam 708.

To further illustrate flow according to FIG. 7, posit the following example. The UE may receive successfully synch signals from at least two downlink transmit beams. The UE selects a first beam and transmits a RACH message1 with a resource and/or preamble corresponding to the first beam. A first counter corresponding to the first beam would now have a value of 1. For the second transmission the UE selects the first beam once again, applies the power ramping function and transmits RACH message1 again. The first counter would now have a value of 2. The UE then selects the second downlink beam for transmitting a RACH message and resets the first counter. The UE transmits RACH message1 again. Now the first counter would have a value of 0 and the second counter a value of 1. The UE now selects the first beam again and transmits RACH message1 again. Now the first counter would have a value of 1 and the second counter would be reset and have a value of 0. The UE now select beam 2 again, applies the power ramping function and transmits RACH message1 again. The first counter value would be reset and now be 0 and the second counter value would be 1. At this point, the UE receives a RACH message2 and the procedure ends. The UE may reset the counters.

Figure 8:
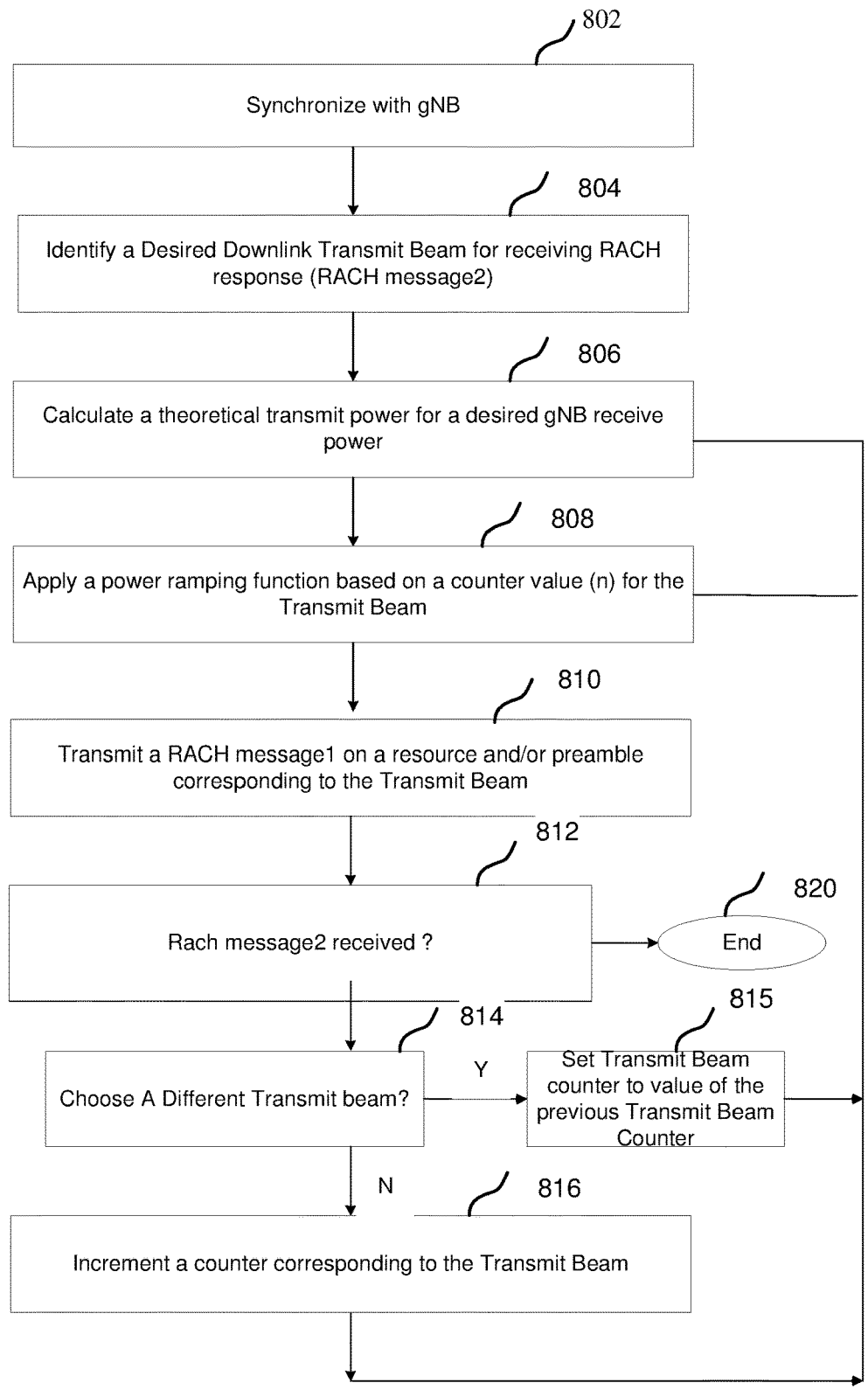
FIG. 8 illustrates a third exemplary flow diagram of a RACH procedure according to an aspect of the present disclosure.

FIG. 8 illustrates a first exemplary flow diagram of a RACH procedure according to an aspect of the present disclosure. A UE may synchronize with a gNB 802. The UE may then detect a number of downlink signals. The downlink signals may be for example SS blocks, CSI-RS signals or other gNB downlink signals. The UE may also identify a desired downlink transmit beam for receiving a RACH message2 804. The UE may then calculate a theoretical transmit power required for a desired gNB receive power 806. The theoretical transmit power may be a function of the transmit antenna array gain, the receive antenna array gain, the desired receive power and the path loss. In one aspect, the uplink path loss may be estimated by calculating the downlink path loss as explained previously.

A series of counters may be employed to count the number or RACH transmissions on each beam. A power ramping function based on the counter value may be applied. In one aspect, the UE will apply a power ramping function base on the counter value (n) for the desired transmit beam 808. For the first transmission the counter value may be 0 with no power ramp applied to the theoretical transmit power. If the RACH transmission is a RACH message1 re-transmission a power ramp may be applied based on the counter value (n). For example, if there had been two previous RACH transmission the counter value (n) would be two. If the power control policy for that beam specified a ½ dB ramp the UE would add 1 db to the theoretical transmit power (i.e ½ dB ramp times counter value (n)=2).

The UE may then transmit RACH message1 on a resource and/or preamble corresponding to the desired downlink transmit beam 810. The UE may then wait for RACH message2 812 and if the RACH message2 is received the process would end 820 and the UE may reset all of the counters. If a RACH message2 is not received the UE may choose a different downlink transmit beam 814, and set the counter corresponding to the newly chosen transmit beam to the value of the previous transmit beam counter 815. In one aspect the flow may revert to calculating a theoretical transmit power for a desired gNB receive power 806. In another aspect the previous theoretical transmit power computed may be used and flow may revert to applying a power ramping function based on a counter value (n) for the transmit beam 808. If RACH message2 is not received and the UE does not choose a different transmit beam 814 the UE may then increment a counter corresponding to the transmit beam 814. The UE may then wait for RACH message2 and if the RACH message2 is received the process would end 820 and the UE may reset all of the counters To further illustrate flow according to FIG. 8, posit the following example. The UE may receive successfully synch signals from at least two downlink transmit beams. The UE selects a first beam and transmits a RACH message1 with a resource and/or preamble corresponding to the first beam. A first counter corresponding to the first beam would now have a value of 1. For the second transmission the UE selects the first beam once again, applies the power ramping function and transmits RACH message1 again. The first counter would now have a value of 2. The UE then selects the second downlink beam for transmitting a RACH message and sets the second counter value equal to the first counter value (i.e. 2). The UE transmits RACH message1 again. Now the first counter would have a value of 2 and the second counter a value of 2. The UE now selects the first beam again and sets the first counter value equal to the second counter value (i.e. 2) and transmits RACH message1 again. Now the first counter would have a value of 2 and the second counter would have a value of 2. The UE now select beam 2 again, and set the second counter value equal to the first counter value (i.e. 2) and applies the power ramping function and transmits RACH message1 again. The first counter value would now be 2 and the second counter value would be 2. At this point, the UE receives a RACH message2 and the procedure ends. The UE may reset the counters.

Figure 9:
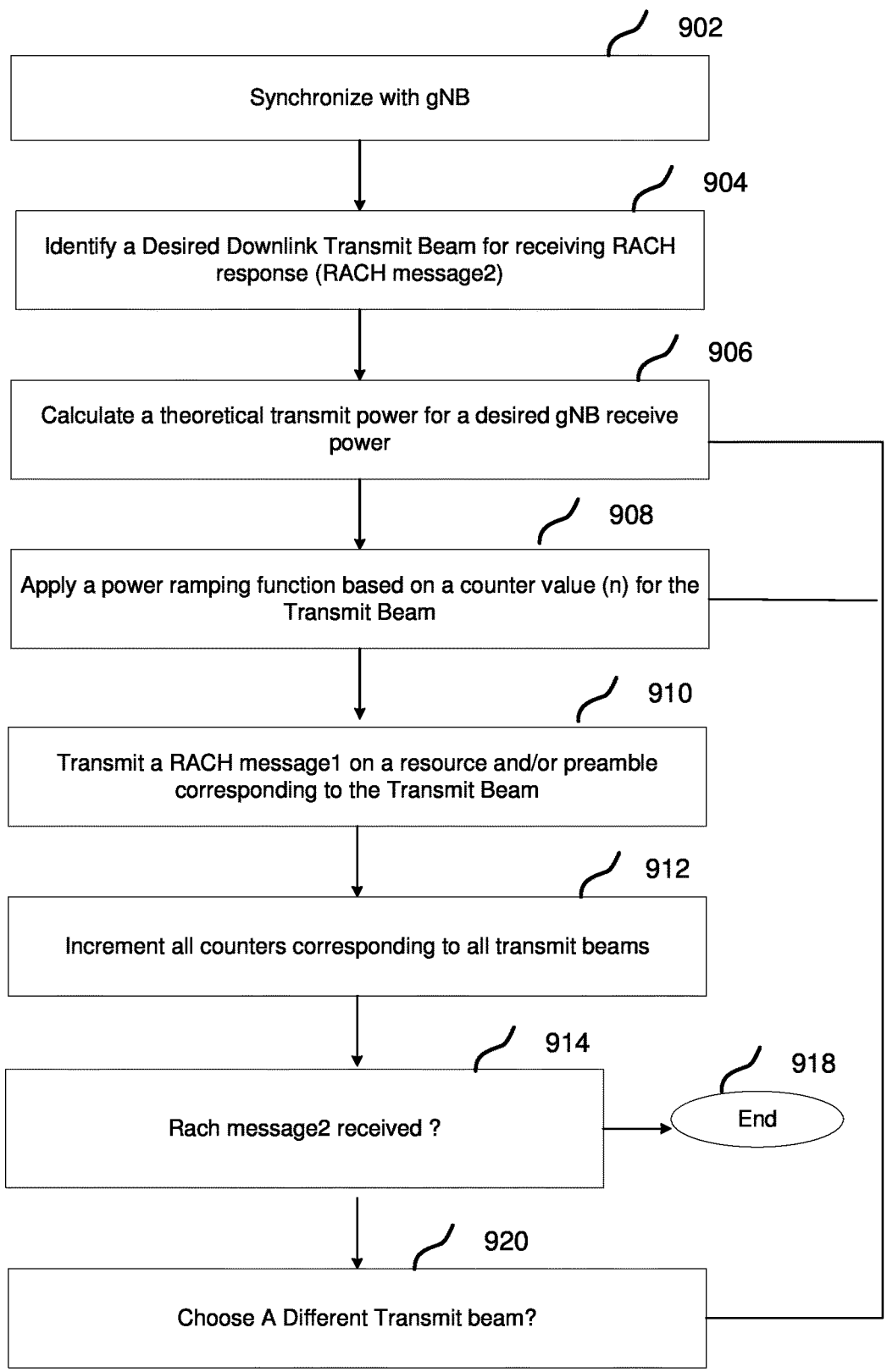
FIG. 9 illustrates a fourth exemplary flow diagram of a RACH procedure according to an aspect of the present disclosure.

FIG. 9 illustrates a first exemplary flow diagram of a RACH procedure according to an aspect of the present disclosure. A UE may synchronize with a gNB 902. The UE may then detect a number of downlink signals. The downlink signals may be for example SS blocks, CSI-RS signals or other downlink beam gNB signal. The UE may also identify a desired downlink transmit beam for receiving a RACH message2 904. The UE may then calculate a theoretical transmit power required for a desired gNB receive power 906. The theoretical transmit power may be a function of the transmit antenna array gain, the receive antenna array gain, the desired receive power and the path loss. In one aspect, the uplink path loss may be estimated by calculating the downlink path loss as explained previously.

A series of counters may be employed to count the number or RACH transmissions on each beam. A power ramping function based on the counter value may be applied. In one aspect, the UE will apply a power ramping function base on the counter value (n) for the desired transmit beam 908. For the first transmission the counter value may be 0 with no power ramp applied to the theoretical transmit power. If the RACH transmission is a RACH message1 re-transmission a power ramp may be applied based on the counter value (n). For example, if there had been two previous RACH transmission the counter value (n) would be two. If the power control policy for that beam specified a 1 dB ramp the UE would add 2 db to the theoretical transmit power (i.e 1 dB ramp times counter value (n)=2).

The UE may then transmit RACH message1 on a resource and/or preamble corresponding to the desired downlink transmit beam 910. The UE may increment all counters corresponding to all transmit beams 912, The UE may then wait for RACH message2 and if RACH message2 is received 914 the process would end 918 and the UE may reset all of the counters. If a RACH message2 is not received, the UE may choose a different downlink transmit beam or may choose the same downlink transmit beam 920. In one aspect the flow may revert to calculating a theoretical transmit power for a desired gNB receive power 906. In another aspect the previous theoretical transmit power computed may be used and flow may revert to applying a power ramping function based on a counter value (n) for the transmit beam 908.

To further illustrate flow according to FIG. 9, posit the following example. The UE may receive successfully synch signals from at least two downlink transmit beams. The UE selects a first beam and transmits a RACH message1 with a resource and/or preamble corresponding to the first beam. A first counter corresponding to the first beam would now have a value of 1. For the second transmission the UE selects the first beam once again, applies the power ramping function and transmits RACH message1 again. The first counter would now have a value of 2. The UE then selects the second downlink beam for transmitting a RACH message. The UE transmits RACH message1 again. Now the first counter would have a value of 3 and the second counter a value of 3. The UE now selects the first beam again and transmits RACH message1 again. Now the first counter would have a value of 4 and the second counter would have a value of 4. The UE now selects beam 2 again. The first counter value would now be 5 and the second counter value would be 5. At this point, the UE receives a RACH message2 and the procedure ends. The UE may reset the counters.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for performing a random access channel (RACH) procedure in a user equipment (UE) comprising:
   receiving a plurality of downlink transmit beams from a base station, the plurality of downlink transmit beams including a first transmit beam and a second transmit beam;
   determining a first power level for transmitting a RACH-message1 based on a value of a first power ramping counter corresponding to the first transmit beam;
   transmitting, at the first power level, the RACH-message1 in a first RACH resource corresponding to the first transmit beam;
   determining to re-transmit the RACH-message1 in a second RACH resource corresponding to the second transmit beam based on failing to receive a RACH-message2 in response to the transmission of the RACH-message1;
   determining a second power level for re-transmitting the RACH-message1 based on a value of a second power ramping counter corresponding to the second transmit beam, the first and second power ramping counters being different;
   re-transmitting, at the second power level, the RACH-message1 in the second RACH resource.

2. The method of claim 1, wherein receiving the first transmit beam comprises receiving a first synchronization signal block (SSB) or a first channel state information reference signal (CSI-RS) on the first transmit beam, and wherein receiving the second transmit beam comprises receiving a second SSB or a second CSI-RS on the second transmit beam.

3. The method of claim 1 further comprising receiving a message from a base station that includes information about the first power ramping counter and the second power ramping counter.

4. The method of claim 3, wherein receiving the message comprises receiving one or more of Remaining Minimum System Information (RMSI), other System Information (OSI), a MAC-CE, Downlink Control Information (DCI) or a radio resource control (RRC) message that includes the information.

5. An apparatus for performing a random access channel (RACH) procedure in a user equipment (UE) comprising:
a receiver configured to receive a plurality of downlink transmit beams from a base station, the plurality of downlink transmit beams including a first transmit beam and a second transmit beam;
a processor configured to determine a first power level for transmitting a RACH-message1 based on a value of a first power ramping counter corresponding to the first transmit beam;
a transmitter configured to transmit at the first power level, the RACH message1 in a first resource of a RACH slot corresponding to the first transmit beam;
wherein the processor is further configured to determine to re-transmit the RACH message1 in a second resource corresponding to the second transmit beam based on failing to receive a RACH-message2 in response to the transmission of the RACH-message1;
wherein the processor is further configured to determine a second power level for re-transmitting the RACH-message1 based on a value of a second power ramping counter corresponding to the second transmit beam, the first and second power ramping counters being different;
wherein the transmitter is also configured to re-transmit, at the second power level, the RACH-message1 in the second RACH resource.

6. The method of claim 1, wherein determining the first power level comprises:
identifying the value of the first power ramping counter; and
applying a first power ramp that is based on the identified value to an initial power level.

7. The method of claim 1, wherein determining the second power level comprises:
identifying the value of the second power ramping counter; and
applying a second power ramp that is based on the identified value of the second power ramping counter to an initial power level.

8. The method of claim 1, further comprising setting the value of the second power ramping counter to the value of the first power ramping counter responsive to the determination to re-transmit the RACH-message1 in the second RACH resource and prior to the re-transmission of the RACH-message1 in the second RACH resource at the second power level.

9. The method of claim 1, further comprising incrementing the value of the first power ramping counter based on the transmission of the RACH-message1 in the first RACH resource at the first power level.

10. The method of claim 9, further comprising incrementing the value of the second power ramping counter based on the transmission of the RACH-message1 in the first RACH resource at the first power level.

11. The method of claim 1, further comprising incrementing the value of the second power ramping counter based on the re-transmission of the RACH-message1 in the second RACH resource at the second power level.

12. The method of claim 1, further comprising resetting the first power ramping counter based on the re-transmission of the RACH-message1 in the second RACH resource at the second power level.

13. The method of claim 1, further comprising:
receiving a RACH-message2 from the base station on the second transmit beam; and
resetting the first power ramping counter and the second power ramping counter based on receiving the RACH-message2.

14. The apparatus of claim 5, wherein to determine the first power level the processor is configured to:
identify the value of the first power ramping counter; and
apply a first power ramp that is based on the identified value to an initial power level.

15. The apparatus of claim 5, wherein to determine the second power level the processor is configured to:
identify the value of the second power ramping counter; and
apply a second power ramp that is based on the identified value of the second power ramping counter to an initial power level.

16. The apparatus of claim 5, wherein the processor is further configured to set the value of the second power ramping counter to the value of the first power ramping counter responsive to the determination to re-transmit the RACH-message1 in the second RACH resource and prior to the re-transmission of the RACH-message1 in the second RACH resource at the second power level.

17. The apparatus of claim 5, wherein the processor is further configured to increment the value of the first power ramping counter based on the transmission of the RACH-message1 in the first RACH resource at the first power level.

18. The apparatus of claim 17, wherein the processor is further configured to increment the value of the second power ramping counter based on the transmission of the RACH-message1 in the first RACH resource at the first power level.

19. The apparatus of claim 5, wherein the processor is further configured to increment the value of the second power ramping counter based on the re-transmission of the RACH-message1 in the second RACH resource at the second power level.

20. The apparatus of claim 5, wherein the processor is further configured to reset the first power ramping counter based on the re-transmission of the RACH-message1 in the second RACH resource at the second power level.

21. The apparatus of claim 5, wherein the processor is further configured to:
receive a RACH-message2 from the base station on the second transmit beam; and
reset the first power ramping counter and the second power ramping counter based on receiving the RACH-message2.

22. The apparatus of claim 5, wherein receiving the first transmit beam comprises receiving a first synchronization signal block (SSB) or a first channel state information reference signal (CSI-RS) on the first transmit beam, and wherein receiving the second transmit beam comprises receiving a second SSB or a second CSI-RS on the second transmit beam.

* * * * *